Patented Feb. 17, 1948

2,436,086

UNITED STATES PATENT OFFICE 2,436,086

PECTIC ACID COMPOSITIONS

Willard E. Baier, Ontario, Calif., assignor to California Fruit Growers Exchange, Los Angeles, Calif., a corporation of California No Drawing. Application February 16, 1942, Serial No. 431,139

4 Claims. (Cl. 167—57)

This invention relates to effervescent mixtures comprising a new and advantageous acidulant, and is particularly directed to baking powder and effervescent therapeutic agents in pill and granular forms and to like products.

Baking powders and effervescent therapeutic mixtures, though employed in specifically different manners and for specifically different purposes, rely on an identical reaction. For many years this reaction has been obtained by means of a solid acid and a carbonate, the most common acids being tartaric and citric, and the most common carbonate being sodium bicarbonate.

Referring specifically to tablets and granular medicinal products relying for their dispersal in water on the formation of carbon dioxide, the most commonly encountered difficulty is deterioration of the material subsequent to packaging and prior to use. This deterioration may be due to different reasons but is probably most often caused by adsorption of atmospheric moisture. The products depend for their satisfactory action on solution together in water of the dry solid acid and the carbonate. When moisture, as from the atmosphere, is adsorbed, the reaction is allowed to take place, the extent depending upon the amount of moisture present. Since the reaction has already taken place, on use of the product it will be found that evolution of carbon dioxide is insufficient, if it occurs at all. Furthermore the moisture causes trouble, particularly with granular materials, in that the entire contents of a package may become one solid mass.

Deterioration is also an objectionable effect found in ordinary baking powders. Here also adsorption of moisture may cause premature reaction of the acidulant and the effervescent agent. Obviously this renders the baking powder ineffective for its intended use.

With baking powder, moreover, there are many other factors which must be taken into account. For example, a given mixture of acid and carbonate, though obviously capable of liberating carbon dioxide in a batch of dough, may give poor results because the reaction and consequent gassing is too rapid, or too slow. Too fast a reaction will result in large pores and coarse texture. A slow mixture may continue to give off carbon dioxide after the dough has hardened, thus breaking the crust, and raising may be insufficient. An otherwise suitable mixture may leave in the final product an objectionable residue.

Again, ordinary baking powder can be used only with sweet milk. Much study has gone into the preparation of baking powder designed to be effective and satisfactory in a wide variety of uses. Various spacing agents, acids, and effervescent agents have been used, the acids and/or effervescent agents have been coated with various materials to control solubility, and various particle sizes of the different ingredients have been tried. Acid reagents suggested and/or used with varying degrees of success include potassium bitartrate, mellitic acid, lactones, calcium phosphate, mucic acid, and adipic acid. Magnesium and calcium carbonates have been used in place of sodium bicarbonate. Corn and other starches and ground rice have been used as spacing agents. These are only a few of the attempts which have been made in the past in an effort to realize the perfect baking powder.

I have found that pectic acid, long known in the laboratory, but even now not widely available commercially, has peculiarly advantageous properties when used either in whole or in part as the acidulant for baking powder and for effervescent tablets and granular preparations. Pectic acid is particularly valuable in lengthening the useful life of such compositions in which it is a constituent. Applied specifically to baking powder it exhibits further desirable properties in a controlled release of carbon dioxide in the dough. The pectic acid salt of the metal ion of the carbonate is entirely innocuous, if not actually beneficial.

An object of my invention is to disclose a new acidulant for effervescent compositions such as baking powder, prepared flours for special purposes, and therapeutic agents.

Another object of my invention is to provide an acidulant of such a character that, when used in baking powder, or in prepared flours, baked goods may be made using either sweet or sour milk.

Another object is to provide a leavening agent which leaves no undesirable mineral residue in the finished product.

A still further object of my invention is to provide effervescent mixtures having new and valuable properties not heretofore known.

An object of this invention is to provide an acidulant for effervescent, therapeutic compositions which will allow such compositions to be maintained in useful condition over periods of time longer than are now possible.

Other objects and advantages of this invention not specifically disclosed will be apparent to those skilled in the art to which my invention is directed.

Specifically to disclose a composition typically suited for therapeutic uses and designed to disintegrate rapidly in water with evolution of carbon dioxide, I give the following example.

| | Grams |
|---|---|
| Milk sugar | 79.4 |
| Pectic acid | 15.6 |
| Sodium bicarbonate | 5.0 |
| Total | 100.0 |

The milk sugar is used in this mixture as a typical soluble ingredient of medicinal pills.

Pectic acid may be used as the acidulant with any of the analgesic, cathartic, or other medicinals customarily used in such preparations.

For comparison another mixture was prepared according to the following proportions.

|  | Grams |
|---|---|
| Milk sugar | 90.0 |
| Sodium bicarbonate | 5.0 |
| Tartaric acid | 5.0 |
| Total | 100.0 |

From each of the above two mixtures were prepared small pills, ¼" in diameter and ¼" in length. When dropped into water shortly after formation, pills of each type disintegrated very rapidly and completely in about 15 seconds. Samples of each were stored side by side, some in cloth-covered containers, and some in corked vials, substantially duplicating present commercial packaging of effervescent tablets and granules. After one week in the cloth-covered containers, the tartaric acid tablets were definitely slower in disintegrating than were the pectic acid tablets. The pectic acid tablets disintegrated not measurably less quickly than originally. Due to the better protection provided by the corked vials, deterioration of both types of pills was slower, but definitely better results were obtained from the pectic acid pills after storage of only 4 weeks, which is a short shelf life for materials of this type.

Preparation of granular materials of this type, either as a step in making pills, or for final use, may be accomplished by known methods. For example, the mixture may be moistened with alcohol or water, run through a sieve and dried. Another method is to granulate the mixture less the acid, then add the acid as a powder, either before or after drying.

Pectic acid combines with sodium bicarbonate approximately in the ratio of 2.6 to 1. It is customary to provide for an excess of acid, and in the example given the ratio is 3.1 to 1.

A very simple baking or leavening powder may be prepared as follows:

|  | Pounds |
|---|---|
| Pectic acid | 65.0 |
| Sodium bicarbonate | 25.0 |
| Starch | 10.0 |
| Total | 100.0 |

In this formula the starch is used as in the prior art to space the particles of acid and bicarbonate. When used in the usual manner, approximately 13% of available $CO_2$ will be evolved.

A second formula uses, in addition to the pectic acid, a proportion of other acidulant:

|  | Pounds |
|---|---|
| Pectic acid | 34.1 |
| Citric acid, anhydrous | 11.5 |
| Sodium bicarbonate | 26.0 |
| Starch | 28.4 |
| Total | 100.0 |

The above formula is preferable where an early partial evolution of gas is desired.

Both the above baking powders exhibit the desirable long life characteristics, and constitute efficacious leavening agents for various types of baked goods. A special characteristic of baking powders including pectic acid as a major constituent is that either fresh or soured milk may be used in the same recipe, and produce baked products hardly distinguishable from each other. Though this theory is not necessarily correct, I believe that this characteristic is due to the fact that the pectic acid is not soluble in a mixture including acid or sour milk, and that consequently the lactic acid of the sour milk takes over the function of acidulant, leaving the pectic acid undissolved and in a condition such that it is not tasted in the final product. Where pectic acid is the sole acidulant used, spacers may be dispensed with, if desired.

Pectic acid is especially useful in prepared flours for such special products as biscuits, cake, etc., since sweet or sour milk may be used.

I use the term "pectic acid" to denote the acidic substance prepared by hydrolysis of pectin and having little or no methoxyl content.

Having described my invention as required by statute, I claim:

1. A therapeutically active tablet comprising a substantially dry and chemically stable mixture of pectic acid and sodium bicarbonate in which the ratio of pectic acid to sodium bicarbonate is within the range of about 2.6 to 3.1 parts of pectic acid to one part of sodium bicarbonate, said mixture being capable of liberating carbon dioxide upon addition of cold water.

2. As a new composition of matter a substantially dry and chemically stable baking or leavening powder comprising as active ingredients thereof pectic acid and sodium bicarbonate, said active ingredients being present in the leavening powder in the ratio of about 3.1 parts of pectic acid to one part of sodium bicarbonate.

3. As a new composition of matter a substantially dry and chemically stable baking or leavening powder comprising as active ingredients thereof pectic acid and sodium bicarbonate, said active ingredients being present in the leavening powder in the ratio of about 2.6 parts of pectic acid to one part of sodium bicarbonate and in addition thereto starch in the amount of about one part of starch for each 2.5 parts of sodium bicarbonate.

4. As a new composition of matter, a substantially dry and chemically stable mixture comprising pectic acid and sodium bicarbonate in which the ratio of pectic acid to sodium bicarbonate is within the range of about 2.6 to 3.1 parts of pectic acid to one part of sodium bicarbonate, said mixture being capable of liberating carbon dioxide upon addition of cold water.

WILLARD E. BAIER.

REFERENCES CITED

The following references are of record in the file of this patent:

UNITED STATES PATENTS

| Number | Name | Date |
|---|---|---|
| 1,065,988 | Umber | July 1, 1913 |

FOREIGN PATENTS

| Number | Country | Date |
|---|---|---|
| 475,182 | Great Britain | Feb. 10, 1936 |
| 371,759 | France | Nov. 23, 1906 |

OTHER REFERENCES

Journal of Physical Chemistry, vol. 42, pages 305 to 315 (1938).

Baier and Wilson, Industrial and Engineering Chemistry, vol. 33, page 288 (March 1941).

Braconnot, Annales de Chimie et Physique, vol. 28 (1825), pages 173, 174.

Hiss and Ebert, New Standard Formulary, 5th ed. (1920), pages 330, 331.

Conrad, American Journal of Botany, vol. 13, page 532 (Nov. 1926).